(12) United States Patent
Chueh (10) Patent No.: US 10,187,844 B2
(45) Date of Patent: Jan. 22, 2019

(54) WIRELESS NETWORK COMMUNICATION SYSTEM AND COMMUNICATION METHOD THEREOF

(71) Applicant: SIAOBAI INC., Taoyuan (TW)

(72) Inventor: Cheng-Hao Chueh, Taoyuan (TW)

(73) Assignee: SIAOBAI INC., Taoyuan (TW)

( * ) Notice: Subject to any disclaimer, the term of this patent is extended or adjusted under 35 U.S.C. 154(b) by 160 days.

(21) Appl. No.: 14/986,605

(22) Filed: Dec. 31, 2015

(65) Prior Publication Data

US 2017/0086124 A1    Mar. 23, 2017

(30) Foreign Application Priority Data

Sep. 18, 2015  (TW) .............................. 104130872 A (51) Int. Cl.
| | | |
|---|---|---|
| *H04B 7/155* | (2006.01) | |
| *H04W 28/02* | (2009.01) | |
| *H04W 40/24* | (2009.01) | |
| *H04W 48/20* | (2009.01) | |
| *H04W 84/20* | (2009.01) | |

(52) U.S. Cl.
CPC ...... *H04W 40/246* (2013.01); *H04B 7/15507* (2013.01); *H04W 28/0236* (2013.01); *H04W 48/20* (2013.01); *H04W 84/20* (2013.01)

(58) Field of Classification Search
CPC .................................................. H04W 40/246

USPC ......................................................... 370/338
See application file for complete search history.

(56) References Cited

U.S. PATENT DOCUMENTS

| | | | | |
|---|---|---|---|---|
| 2010/0330997 | A1* | 12/2010 | Lee ........................ | H04W 92/02 455/436 |
| 2015/0327127 | A1* | 11/2015 | Centonza .......... | H04W 36/0055 455/436 |
| 2016/0192323 | A1* | 6/2016 | Kim ...................... | H04W 68/02 455/458 |
| 2016/0219473 | A1* | 7/2016 | Teyeb ................ | H04W 36/0088 |
| 2017/0215117 | A1* | 7/2017 | Kwon ................ | H04W 36/0094 |

* cited by examiner

*Primary Examiner* — Christopher P Crompton
(74) *Attorney, Agent, or Firm* — Cheng-Ju Chiang (57) ABSTRACT

A wireless network communication system and its communication method of the present invention is mainly initiated from an interconnected state between a master controller, at least one slave controller and at least one working station (STA). The at least one slave controller is capable of transmitting an uplink signal strength (rssiVal) with the at least one working station (STA) to the master controller so that the master controller can instruct commands of disconnection or connection to the at least one slave controller according to the uplink signal strength (rssiVal) with the at least one working station (STA) transmitted from the at least one slave controller, and the at least one slave controller can automatically disconnecting from or connecting with the at least one working station (STA) so as to achieve automatic switch between base stations (wireless Internet devices) and obtain the best and most stable connection quality.

9 Claims, 5 Drawing Sheets

WIRELESS NETWORK COMMUNICATION SYSTEM AND COMMUNICATION METHOD THEREOF

BACKGROUND OF THE INVENTION

1. Field of the Invention

The present invention relates to a wireless network communication system and communication method thereof, particularly with regard to a system and method which are initiated from an interconnection state between a master controller, at least one slave controller and at least one working station (STA) to allow a wireless network to automatically assign a slave controller having the most optimal connection to the at least one working station (STA) after operations, and to automatically switch between base stations (wireless Internet devices). The present invention is applicable to wireless networks or similar systems.

2. The Related Arts

In current wireless networks, a wireless router is mostly used as a gate to connect to the Internet. Some users will purchase expansion equipment such as a wireless access point (AP) or a wireless repeater (repeater) in order to expand coverage of their wireless networks. However, general wireless networks require an authentication for users to log in and to further connect to the Internet. Therefore, a user's wireless device will become disconnection and cannot connect to the Internet once the wireless device is away from an originally used access point (AP) or repeater. Even if there are other access points (AP) or repeaters nearby, the wireless device is still irresponsive for connection to the Internet because the user's wireless device will not automatically connect itself to a new repeater if the user's wireless device does not be authenticated by the new access point (AP) or repeater. Only when users manually input a new name (UUID) and password of a new repeater on the wireless device by themselves, the new repeater will allow the wireless device to connect for uplink and further to connect to the Internet. Furthermore, in the current design of user's wireless devices, the user's wireless device is set to try its best to maintain connection with the originally used access point (AP) or repeater in order to stay connected to the Internet for users as long as a connection situation thereof allows even though a quality of wireless connection with the originally used access point (AP) or repeater is already very bad. The above also results in a situation that, even if there is another available (authentication is finished) access point (AP) or repeater having a better signal strength nearby, the user's wireless device still will not switch to the another access point (AP) or repeater because the connection in use does not reach a situation that signals are not completely lost.

In addition, with rising of smart products (such as smart phones, tablet computers, home appliances, etc.), users' demands for home wireless networks become higher and higher. Although wireless Internet devices (access points (AP), repeaters, or routers) asserted to have super-large coverage of wireless networks are promoted in the market, they provide little help for the above-mentioned smart products. The reason for the above situation is that coverage of the wireless Internet devices may be large, but coverage of smart products to return signals is much smaller than the wireless routers. As a result, a situation that the smart products can receive signals coming from the wireless Internet devices but the smart products cannot transmit their own signals back to the wireless Internet devices may occur, and results in an occasion that the smart products are still unable to connect to the Internet.

Hence, there are a number of technology and designs for solutions to the above. In some of these designs, sensitivity of a connection quality in the user's wireless device is changed. In other designs, users are allowed to build a frequently used wireless group on their own in order to facilitate determination of the wireless devices to switch. The above mentioned technology become usually very difficult to use because the above mentioned technology is built in the users' wireless device by its manufacturer based on its own design, and more and more user's wireless devices having different brands enter the market. As a result, users simply do not know whether or not the wireless device they purchase has such a technology support, or how to change related settings in the wireless device. Furthermore, incompatibility problem may also occur between wireless devices having different brands.

Thus, in view of the above deficiency and drawbacks, the named inventor(s) of the present invention hopes to propose a wireless network communication system and communication method thereof having functions to automatically switch between base stations (wireless Internet devices) so that users can easily complete related operations and installations. The named inventor(s) makes painstaking efforts to research and study, design and fabricate to provide convenience for users. The above is inventive motives to develop and research the present invention.

SUMMARY OF THE INVENTION

The main object of the present invention is to provide a wireless network communication system and communication method thereof. By an interconnected state between a master controller, at least one slave controller and at least one working station (STA), the at least one slave controller is capable of transmitting an uplink signal strength (rssiVal) with the at least one working station (STA) to the master controller. The master controller is able to instruct commands of disconnection or connection to the at least one slave controller according to the uplink signal strength (rssiVal) with the at least one working station (STA) transmitted from the at least one slave controller. The at least one slave controller is capable of automatically disconnecting from or connecting with the at least one working station (STA) to achieve automatic switch between base stations (wireless Internet devices), and to obtain the best, most stable connection quality. Furthermore, in actual practice of the system, functions of a slave controller may be built in the master controller to enhance overall practicability.

The other object of the present invention is to provide a wireless network communication system and communication method thereof. When the at least one working station (STA) is connected with the at least one slave controller, a dynamic mechanism of a max inner threshold, an outer threshold, a tolerance strength value (toleranceVal) and an inner threshold is defined. Among them, the outer threshold is determined by a value of the inner threshold minus the tolerance strength value (toleranceVal). The dynamic mechanism of the inner threshold comprises a step of setting a temporary region status of the at least one working station (STA) as an outer region when the uplink signal strength (rssiVal) of the at least one working station (STA) is less than the outer threshold, and a step of setting the temporary region status of the at least one working station (STA) as an inner region when the uplink signal strength (rssiVal) is greater than the inner threshold. Meanwhile, the inner threshold will be recalculated. Through the steps mentioned above, the at least one slave controller can quickly determine a location of the working station (STA), and determine which one of slave controllers is closer to the at least one working station (STA). The master controller is able to judge and determine which one of slave controllers for uplink connection is able to provide the best connection quality according to transmitted uplink information from the at least one working station (STA), and thus to increase overall optimization of the entire system.

To achieve the above objects, a wireless network communication system of the present invention comprises a master controller, at least one slave controller and at least one working station (STA). The at least one working station (STA) is capable of connecting for uplink with the master controller or the at least one slave controller. The present invention is characterized that the at least one slave controller proactively provides an identification code (UUID) thereof to the master controller so that the at least one slave controller is able to form an interconnected state with the master controller, and the at least one slave controller is capable of transmitting an uplink signal strength (rssiVal) with the at least one working station (STA) to the master controller. The master controller is able to instruct commands of disconnection or connection to the at least one slave controller according to the uplink signal strength (rssiVal) with the at least one working station (STA) transmitted from the at least one slave controller. The at least one slave controller is capable of automatically disconnecting from or connecting with the at least one working station (STA).

Furthermore, a wireless network communication method of the present invention is mainly used for wireless networks, a wireless network using the method comprising a master controller, at least one slave controller and at least one working station (STA), the method comprising the following steps.

The at least one slave controller firstly proactively provides an identification code (UUID) thereof to the master controller so that the at least one slave controller is able to form an interconnected state with the master controller.

Secondly, the at least one working station (STA) is connected for uplink with the at least one slave controller.

The at least one slave controller then transmits an uplink signal strength (rssiVal) of the at least one working station (STA) connected with the at least one slave controller to the master controller.

The master controller then instructs commands of disconnection or connection to the at least one slave controller according to the uplink signal strength (rssiVal) with the at least one working station (STA) transmitted from the at least one slave controller.

The at least one slave controller then automatically disconnects from or connects with the at least one working station (STA) based on the instructed commands of the master controller.

In order to better understand features, characteristics and technical contents of the present invention, please refer to the following detailed descriptions and the accompanying drawings relating to the present invention. However, the accompanying drawings are only used for reference and description, and not used for limiting the present invention.

DETAILED DESCRIPTION OF PREFERRED EMBODIMENT

Referring to FIGS. 1-5, FIGS. 1-5 show schematic diagrams of an embodiment in accordance with the present invention. A wireless network communication system and communication method thereof in accordance with the preferred embodiment of the present invention is used to maintain connection quality of a wireless network so as to improve the criticized poor quality of the existing wireless network connection, and to form an interconnected state between wireless Internet connecting devices for management and to allow the system having an effective capacity of automatically updating to acquire the latest systematic information for achieving that a working station (STA) can be automatically connected to the best available network.

Figure 1:
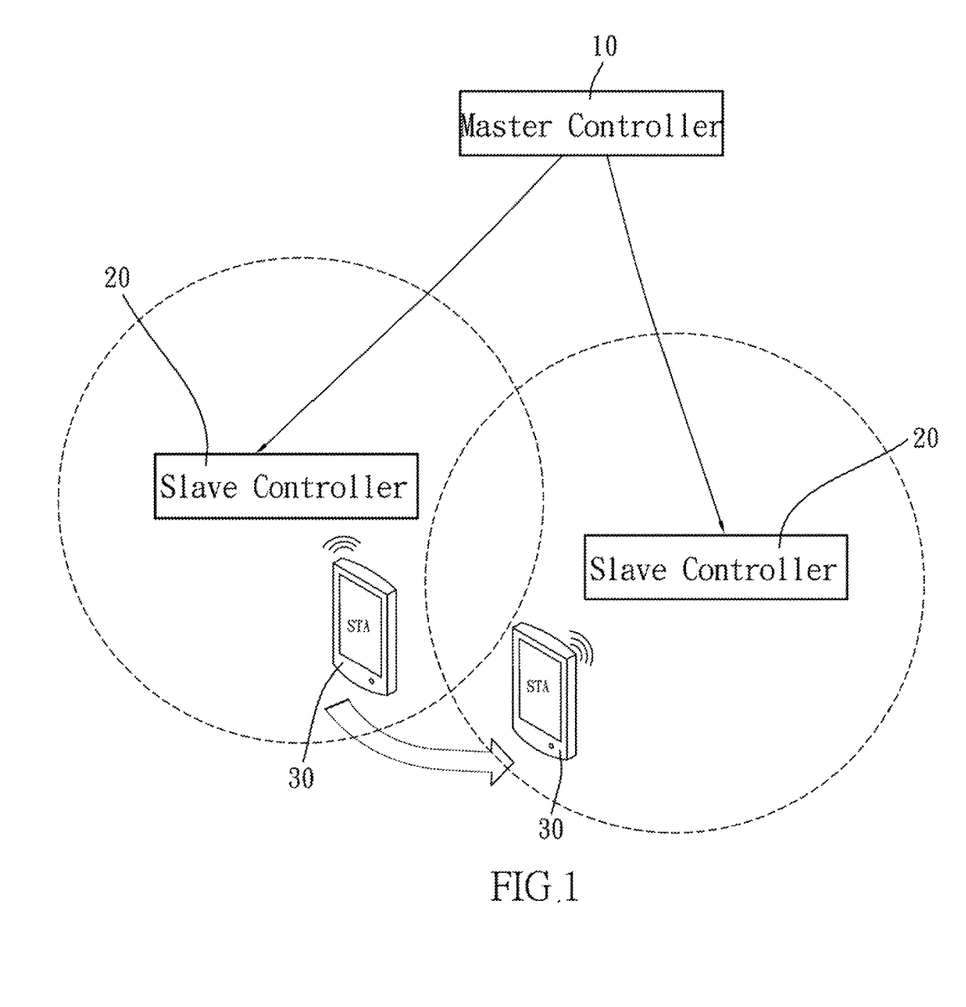
FIG. 1 shows a schematic diagram of a master architecture of a wireless network communication system in accordance with the present invention.

A wireless network communication system in accordance with the present invention comprises a master controller 10, at least one slave controller 20 and at least one working station (STA) 30 (as shown in FIG. 1), and the at least one working station (STA) 30 is connected to uplink to the master controller 10 or the slave controller 20. In the meantime, the master controller 10 is a device with network function, and the at least one slave controller 20 can be a device with network function and the device is any one of a computer with wireless function, a wireless router, an access point, a repeater, an extender or a wireless client, etc. In addition, the at least one working station (STA) 30 is a wireless client, and the wireless client is any one of a personal computer (PC) with wireless function, a thin client or compact computer, a tablet personal computer, a notebook, a smart mobile phone, a personal digital assistant, and a network module with wireless (WI-FI) function, etc.

In addition, the at least one slave controller 20 proactively provides its identification code (universally unique identifier, UUID) to the master controller 10 so that the at least one slave controller 20 is able to form an interconnected state with the master controller 10. Within the identification code (UUID), a name and a code of the slave controller 20 are comprised. Hence, the master controller 10 is able to identify the slave controller 20 in order for receiving uplink information or providing commands. In a preferred embodiment of the present invention, a master controller 10 which can simultaneously manage six slave controllers 20 is primarily designed, however, other different quantities of the slave controllers 20 are also able to be designed. A setting mode of the master controller 10 is set to form an interconnected network between the six slave controllers 20 and the master controller 10 in order to facilitate quick signal transmission. The master controller 10 may comprise (or built-in) functions of a slave controller 20.

Figure 2:
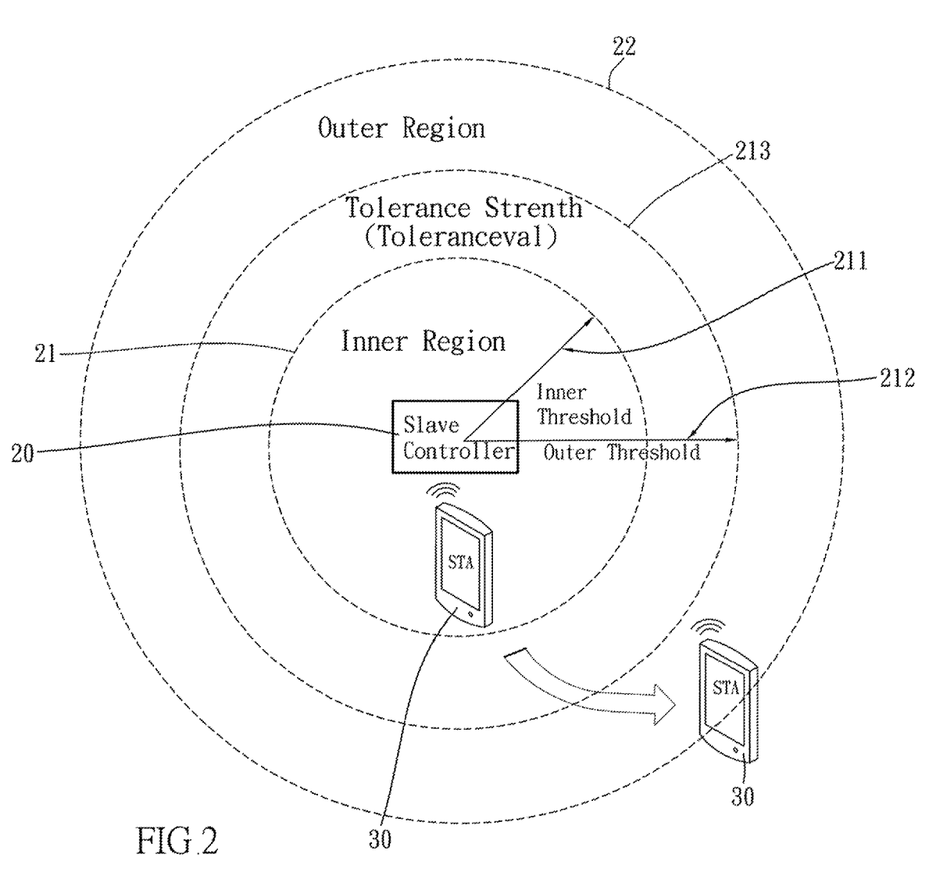
FIG. 2 shows a schematic diagram of uplink between a slave controller and at least one working station (STA) in accordance with the present invention.

In addition, the slave controller 20 is capable of transmitting an uplink signal strength (or a received signal strength indicator value, abbreviated as "rssiVal") of the at least one working station (STA) 30 to the master controller 10. Meanwhile, the slave controller 20 defines wireless signal ranges thereof according to an extent of its own reception capacity. The wireless signal ranges are respectively defined as an inner region 21 and an outer region 22 (as shown in FIG. 2) from a center of the slave controller 20 extending outward. In the inner region 21, an inner threshold 211 and an outer threshold 212 are defined based on the signal strength (rssiVal). The outer threshold 212 is set to be calculated by the following formula: the inner threshold 211−a tolerance strength value (abbreviated as "toleranceVal") 213. As a result, when the at least one working station (STA) 30 is located in a region defined by the outer threshold 212 between the inner region 21 and the outer region 22, the at least one working station (STA) will not be disconnected because of unstable variation of the signal strength (RSSI) indication of the at least one working station (STA) 30.

The at least one slave controller 20 not only transmits the uplink signal strength (rssiVal) of the at least one working station (STA) 30 to the master controller 10, but also transmits information including a weight function coefficient (WF), an uplink type, a quantity of uplink client and an uplink bandwidth (UBW) remnant value to the master controller 10. As a result, the master controller 10 can respectively classify the slave controller 20 as an access point (AP) or different levels of repeaters according to the received information in order to generate a priority use order respectively for these two types of the slave controllers.

When the slave controller 20 is classified as an access point (AP), the uplinked weight function coefficients (WF) comprise uplink bandwidth (UBW) remnant value weight function coefficient (UBWWF) and uplink connected client number (CCN) weight function coefficient (CCNWF). Hence, the master controller 10 can calculate a use priority grade value (UPV) of the access point based on the received information in use of the following calculation formula: (uplink bandwidth (UBW) remnant value×uplink bandwidth (UBW) remnant value weight function coefficient (UBWWF))+(uplink connected client number (CCN)×uplink connected client number (CCN) weight function coefficient (CCNWF)).

When the slave controller 20 is classified as a repeater, the transmitted information comprises uplink device information (media access control, MAC) of the slave controller 20. The weight function coefficients (WF) comprise repeater weight function coefficient (RPWF), uplink bandwidth (UBW) remnant value weight function coefficient (UBWWF) and uplink connected client number (CCN) weight function coefficient (CCNWF). Hence, the master controller 10 can calculate the use priority grade values (UPV) of different levels of the repeaters based on the received information as above in use of the following calculation formula: (repeater weight function coefficient (RPWF))^(a quantity of repeaters)×(uplink bandwidth (UBW) remnant value×uplink bandwidth (UBW) remnant value weight function coefficient (UBWWF)+uplink connected client number (CCN)×uplink connected client number (CCN) weight function coefficient (CCNWF)).

As a result, the master controller 10 can instruct commands for disconnection or connection to the at least one slave controller 20 according to the uplink signal strength (rssiVal) with the at least one working station (STA) 30 and a regional state transmitted from the at least one slave controller 20. The slave controller 20 can thus automatically disconnect or connect the at least one working station (STA) 30.

Therefore, when the master controller 10 finds that the at least one working station (STA) 30 moves from the inner region 21 to the outer region 22 of the slave controller 20 connected with the at least one working station (STA) 30 for more than a preset time, and another slave controller 20 is able to judge that the at least one working station (STA) 30 is located within the inner region 21 of the another slave controller 20 based on a situation of the signal strength (rssiVal) of the at least one working station (STA) 30 associated with the another slave controller 20, the master controller 10 will instruct commands of disconnection to the slave controller 20 which is originally connected to the at least one working station (STA). The originally connected slave controller 20 then will automatically disconnect from the at least one working station (STA) 30. In the meantime, the master controller will also instruct commands of connection to the another slave controller 20. The another slave controller 20 will automatically connect with the at least one working station (STA) 30. The design of a dynamic mechanism and check (Chk) times of a region counter can avoid any interference onto the entire system caused by temporary moving of the at least one working station (STA) 30, or by temporary unstable states of the uplink signal strength (rssiVal) of the at least one working station (STA) 30.

Figure 3:
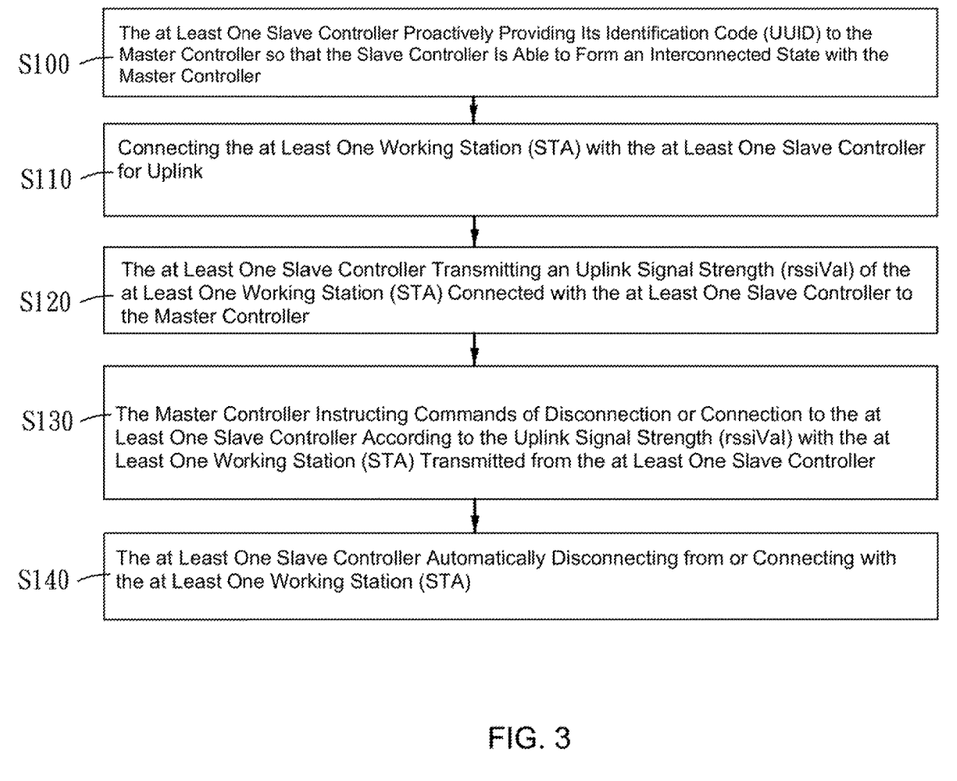
FIG. 3 shows a schematic diagram of a flow chart of main process steps in accordance with the present invention.

A wireless network communication method in accordance with the present invention (as shown in FIG. 3) is mainly used for wireless networks. In a wireless network using the method of the present invention, a master controller 10, at least one slave controller 20 and at least one working station (STA) 30 are comprised. The master controller 10 in accordance with the present invention is a device with network function, and the at least one slave controller 20 can be a device with network function and the device is any one of a computer with wireless function, a wireless router, an access point, a repeater, an extender or a wireless client, etc. In addition, the at least one working station (STA) 30 is a wireless client, and the wireless client is any one of a personal computer (PC) with wireless function, a thin client or compact computer, a tablet personal computer, a notebook, a smart mobile phone, a personal digital assistant, and a network module with wireless (WI-FI) function, etc.

In a step S100 to be firstly performed, a step of the at least one slave controller 20 proactively providing its identification code (UUID) to the master controller 10 so that the slave controller 20 is able to form an interconnected state with the master controller 10 is performed. According to the above, the slave controller 20 proactively provides its identification code (UUID) to the master controller 10. The identification code (UUID) comprises a name and a code of the slave controller 20. Hence, the master controller 10 is able to identify the slave controller 20 in order for receiving uplink information or instructing commands. In a preferred embodiment of the present invention, a master controller 10 which can simultaneously manage six slave controllers 20 is primarily designed, however, other different quantities of the slave controllers 20 are also able to be designed. A setting mode of the master controller 10 is set to form an interconnected network between the six slave controllers 20 and the master controller 10 in order to facilitate quick signal transmission. After completion of the above described step S100, a next step S110 is processed.

Furthermore, in the next step S110, a step of connecting the at least one working station (STA) 30 with the at least one slave controller 20 for uplink is performed. In the step S110, the at least one working station (STA) 30 provides its identification code (UUID) to the at least one slave controller 20. Within the identification code (UUID), a name and a code of the working station (STA) 30 are comprised. The slave controller 20 is able to identify the at least one working station (STA) 30 so that the at least one working station (STA) 30 is able to uplink to the at least one slave controller 20 for facilitate management. After completion of the above described step S110, a next step S120 is processed.

Furthermore, in the next step S120, a step of the at least one slave controller 20 transmitting an uplink signal strength (rssiVal) of the at least one working station (STA) 30 connected with the at least one slave controller 20 to the master controller 10 is performed. When the at least one working station (STA) 30 is connected with the at least one slave controller 20 for uplink, the at least one slave controller 20 defines wireless signal ranges thereof according to an extent of its own reception capacity. The wireless signal ranges are respectively defined as an inner region 21 and an outer region 22 (as shown in FIG. 2) from a center of the slave controller 20 extending outward. In the inner region 21, an inner threshold 211 and an outer threshold 212 are defined based on the signal strength (rssiVal). The at least one slave controller 20 can transmit the uplink signal strength (rssiVal) with the at least one working station (STA) 30 to the master controller 10 so that the master controller 10 can calculate based on the uplink signal strength (rssiVal) and determine a regional state including a location of the at least one working station (STA) 30. After completion of the above described step S120, a next step S130 is processed.

Figure 4:
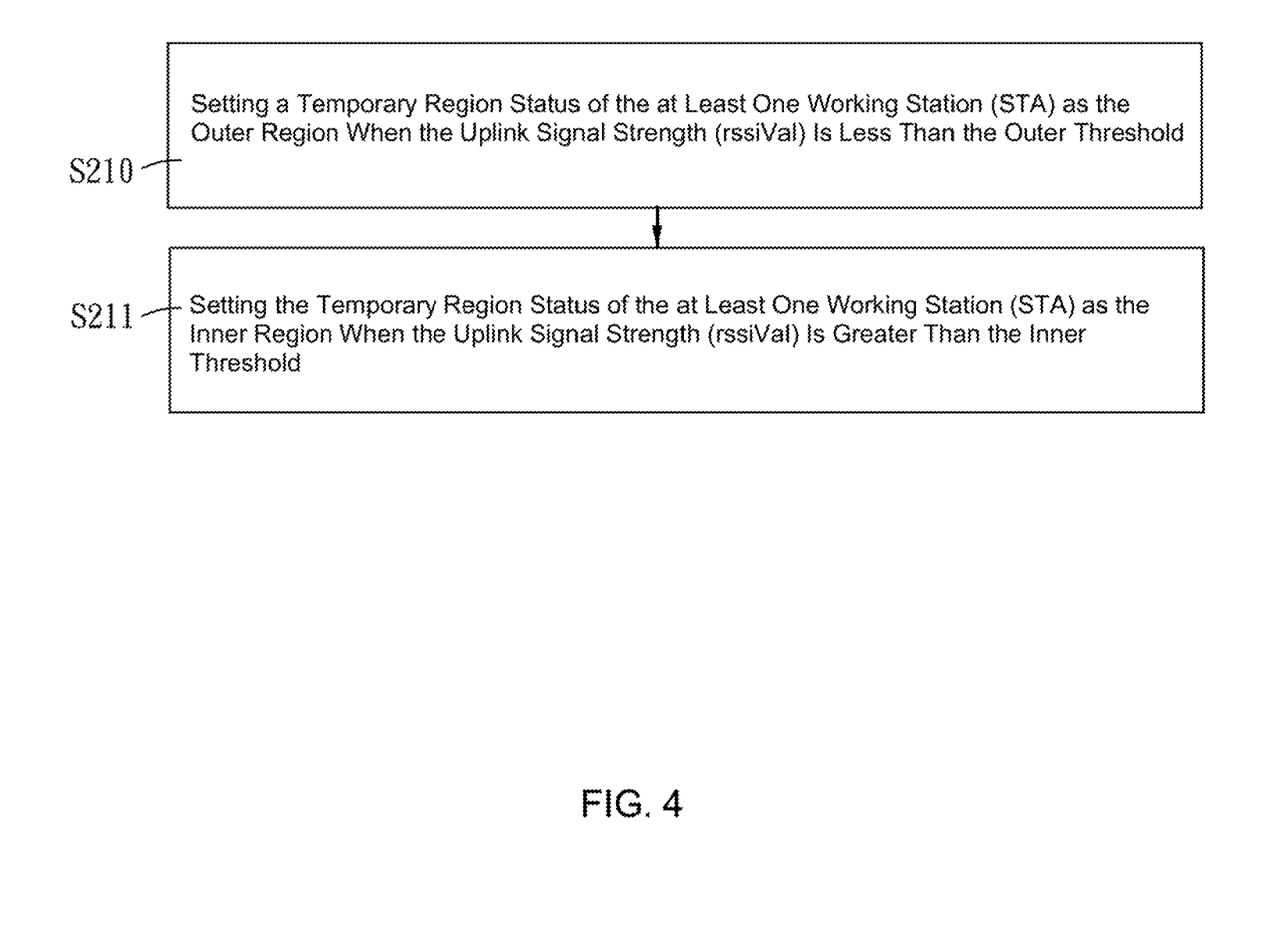
FIG. 4 shows a schematic diagram of a flow chart of process steps of a dynamic mechanism of an inner threshold in accordance with the present invention.

When the at least one working station (STA) 30 mentioned above is connected with the at least one slave controller 20 for uplink, an inner threshold 211, an outer threshold 212 and a max inner threshold based on the signal strength (rssiVal) are set, a dynamic mechanism of the inner threshold 211 comprises the following steps (as shown in FIG. 4).

In a step S210, a step of setting a temporary region status of the at least one working station (STA) 30 as the outer region 22 when the uplink signal strength (rssiVal) is less than the outer threshold 212 is performed.

In a step S211, a step of setting the temporary region status of the at least one working station (STA) 30 as the inner region 21 when the uplink signal strength (rssiVal) is greater than the inner threshold 211 is performed.

When a current region status of the at least one working station (STA) 30 is the inner region 21 and the inner threshold 211 is less than the max inner threshold, the inner threshold 211 is gradually increased over time to approach the max inner threshold. In addition, a unit of the signal strength (rssiVal) as mentioned above is an absolute value of power expressed in decibel-milliwatts (abbreviated as dBm or dBmW). When the uplink signal strength (rssiVal) is less than the outer threshold 212, it is very likely that the at least one working station (STA) 30 is about to leave a signal range of the at least one slave controller 20 connected with the at least one working station (STA) 30 for uplink. When the uplink signal strength (rssiVal) is greater than the outer threshold 212, the at least one working station (STA) 30 is considered to be much closer to the at least one slave controller 20 connected therewith for uplink, and connective signals therebetween are stronger. The outer threshold 212 is calculated by the following formula: the inner threshold 211−the tolerance strength value (toleranceVal) 213.

In addition, when the inner threshold 211 of the at least one working station (STA) 30 varies, a recalculation of the check (Chk) times of the at least one working station (STA) 30 is processed. The related calculation equation to the check times is set as follows: the check (Chk) times=max inner check (Chk) times×(nn+1)÷2, wherein nn=(the max inner threshold−the outer threshold)÷the tolerance strength value (toleranceVal).

Figure 5:
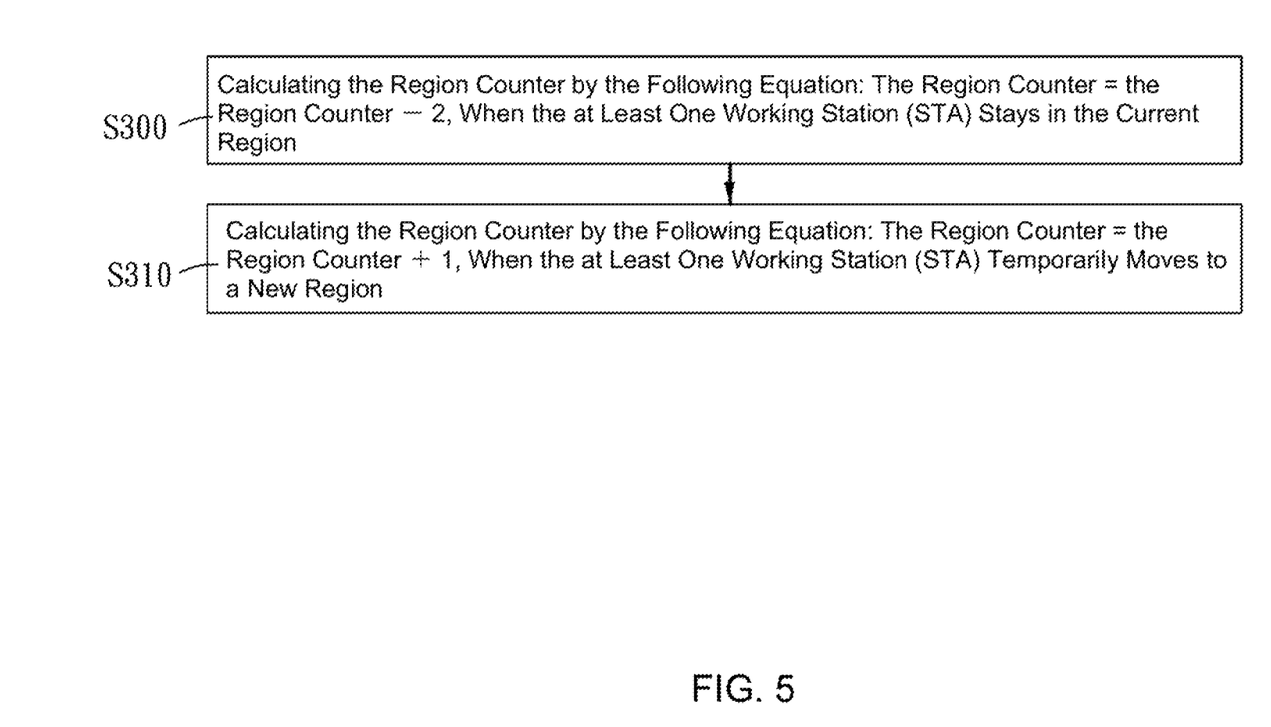
FIG. 5 shows a schematic diagram of a flow chart of process steps of a dynamic mechanism of a region counter in accordance with the present invention.

Furthermore, when the at least one working station (STA) 30 is connected with the at least one slave controller 20 for uplink, a region counter is set. The region counter is used for calculating a staying time of the at least one working station (STA) 30 temporarily moving to a new region. When the region counter is greater than or equal to the check (Chk) times, the current region status of the at least one working station (STA) 30 is then changed to the new region. The region counter is designed with a dynamic mechanism, and the dynamic mechanism comprises the following steps (as shown in FIG. 5).

In a step S300, calculating the region counter by the following equation: the region counter=the region counter−2, when the at least one working station (STA) 30 stays in the current region.

In a step S310, calculating the region counter by the following equation: the region counter=the region counter+1, when the at least one working station (STA) 30 temporarily moves to a new region.

The at least one working station (STA) 30 is preferred to quickly calculate the check (Chk) times and the region counter, and then to upload to the at least one slave controller 20.

Furthermore, in the next step S130, a step of the master controller 10 instructing commands of disconnection or connection to the at least one slave controller 20 according to the uplink signal strength (rssiVal) with the at least one working station (STA) 30 transmitted from the at least one slave controller 20 is performed. When the at least one working station (STA) 30 moves from the inner region 21 to the outer region 22 of the at least one slave controller 20 for a certain time, the slave controller 20 transmits the signal strength (rssiVal) of the at least one working station (STA) 30 to the master controller 10 to allow the master controller 10 to learn a current location of the at least one working station (STA) 30. Then, according to the current location of the at least one working station (STA) 30, the master controller 10 instructs commands to disconnect to the slave controller 20 which is originally connected for uplink with the at least one working station (STA) 30, and further instructs commands to connect to a slave controller 20 which is a nearest slave controller 20 for the at least one working station (STA) 30. After completion of the above described step S130, a next step S140 is processed.

Furthermore, in the next step S140, a step of the at least one slave controller 20 automatically disconnecting from or connecting with the at least one working station (STA) 30 is performed. When the slave controller 20 which is originally connected with the at least one working station (STA) 30 for uplink receives the commands of uplink disconnection instructed from the master controller 10, the slave controller 20 then disconnects its uplink connection with the at least one working station (STA) 30. When a nearest slave controller 20 for the at least one working station (STA) 30 receives the commands of connection instructed from the master controller 10, the nearest slave controller 20 will automatically connect with the at least one working station (STA) 30 for uplink to allow the at least one working station (STA) 30 to have the best connection quality without any need of manual switch by users' own. The system and method in accordance with the present invention will automatically and quickly complete switch between base stations (slave controllers 20), and users do not need to worry about whether or not a new wireless network is required to be found for switch.

Furthermore, when the name and the code, i.e., the identification code (UUID) of the at least one working station (STA) 30 are desired to change, as long as a new name and a new code of the at least one working station (STA) 30 are provided to the master controller 10, the master controller 10 will automatically notify the new name and the new code of the at least one working station (STA) 30 which are desired to change to all of slave controllers 20 so that all of the slave controllers 20 can automatically replace the new name and the new code as desired in order to proceed connection for uplink.

From the above detailed descriptions, it can be understood by the skilled in the art that the present invention can indeed achieve the above objects, and already comply with provisions of the patent law. Therefore the present invention is proposed to file as a patent application.

However, the above described is only used for explanations and descriptions of a preferred embodiment of the present invention, and not used to limit the practice scope of the present invention. Where those skilled in this art can make all sorts of other change or improvements based on the above descriptions and claims, the changes or improvements are still covered within the inventive spirit of the present invention and the scope as defined in the following claims.

What is claimed is:

1. A wireless network communication system, comprising a master controller, at least two slave controllers and at least one working station (STA), and the at least one working station (STA) being capable of respectively connecting for uplink with the at least two slave controllers, wherein each of the at least two slave controllers is able to proactively provide an identification code (UUID) thereof to the master controller so that the each of the at least two slave controllers is able to form an interconnected state with the master controller, and the each of the at least two slave controllers is capable of transmitting an uplink signal strength (rssiVal) of the at least one working station (STA) with the each of the at least two slave controllers to the master controller, the master controller is able to instruct commands of disconnection or connection to the each of the at least two slave controllers according to the uplink signal strength (rssiVal) with the at least one working station (STA) transmitted from the each of the at least two slave controllers, the each of the at least two slave controllers is capable of automatically disconnecting from or connecting with the at least one working station (STA) based on the commands from the master controller;

wherein the each of the at least two slave controllers is further able to transmit information including a weight function coefficient (WF), an uplink type, a quantity of uplink clients and an uplink bandwidth (UBW) remnant value to the master controller, and the master controller is able to classify the each of the at least two slave controllers as an access point (AP) or one of different levels of repeaters according to the received information in order to generate a priority use order for the each of the at least two slave controllers classified as one of the AP or repeaters.

2. The wireless network communication system as claimed in claim 1, wherein when the each of the at least two slave controllers is classified as an access point (AP), the weight function coefficient (WF) transmitted by the each of the at least two slave controllers as an AP further comprises uplink bandwidth (UBW) remnant value weight function coefficient (UBWWF) and uplink connected client number (CCN) weight function coefficient (CCNWF), the master controller is able to calculate a use priority grade value (UPV) of the access point based on the received information in use of the following calculation formula: (uplink bandwidth (UBW) remnant value×uplink bandwidth (UBW) remnant value weight function coefficient (UBWWF))+(uplink connected client number (CCN)×uplink connected client number (CCN) weight function coefficient (CCNWF)).

3. The wireless network communication system as claimed in claim 1, wherein when the each of the at least two slave controllers is classified as a repeater, the transmitted information by the each of the at least two slave controllers as a repeater further comprises an uplink device information (media access control, MAC) of the at least one slave controller, the weight function coefficient (WF) further comprises repeater weight function coefficient (RPWF), uplink bandwidth (UBW) remnant value weight function coefficient (UBWWF) and uplink connected client number (CCN) weight function coefficient (CCNWF), the master controller is able to calculate a use priority grade values (UPV) of the classified repeater out of different levels of repeaters based on the received information in use of the following calculation formula: (repeater weight function coefficient (RPWF))^(a quantity of repeaters)×(uplink bandwidth (UBW) remnant value×uplink bandwidth (UBW) remnant value weight function coefficient (UBWWF)+uplink connected client number (CCN)×uplink connected client number (CCN) weight function coefficient (CCNWF)).

4. The wireless network communication system as claimed in claim 1, wherein the master controller is equipped with network function, and the each of the at least two slave controllers is equipped with network function and is any one of a computer with wireless function, a wireless router, an access point, a repeater, an extender or a wireless client, and the at least one working station (STA) is a wireless client.

5. A wireless network communication method used in wireless networks, a wireless network using the method comprising a master controller, at least two slave controllers and at least one working station (STA), the method comprising steps of:

proactively providing, by each of the at least two slave controllers, an identification code (UUID) thereof to the master controller so that the each of the at least two slave controllers is able to form an interconnected state with the master controller;

connecting the at least one working station (STA) for uplink with the each of the at least two slave controllers;

transmitting, by the each of the at least two slave controllers, an uplink signal strength (rssiVal) of the at least one working station (STA) connected with the each of the at least two slave controllers to the master controller;

instructing commands of disconnection or connection, by the master controller, to the each of the at least two slave controllers according to the uplink signal strength (rssiVal) with the at least one working station (STA) transmitted from the each of the at least two slave controllers; and disconnecting from or connecting with automatically, by the each of the at least two slave controllers, the at least one working station (STA) based on the instructed commands of the master controllers;

wherein the each of the at least two slave controllers is further able to transmit information including a weight function coefficient (WF), an uplink type, a quantity of uplink clients and an uplink bandwidth (UBW) remnant value to the master controller, and the master controller is able to classify the each of the at least two slave controllers as an access point (AP) or one of different levels of repeaters according to the received information in order to generate a priority use order for the each of the at least two slave controllers classified as one of the AP or repeaters.

6. The wireless network communication method as claimed in claim 5, wherein when the at least one working station (STA) is connected for uplink with the each of the at least two slave controllers, the method further comprises a step of defining, by the master controller, an inner threshold and an outer threshold based on the received signal strength (rssiVal), and a step of applying the inner threshold and the outer threshold by the master controller comprises steps of:
  setting a temporary region status of the at least one working station (STA) as an outer region when the uplink signal strength (rssiVal) of the at least one working station (STA) is less than the outer threshold; and
  setting the temporary region status of the at least one working station (STA) as an inner region when the uplink signal strength (rssiVal) is greater than the inner threshold.

7. The wireless network communication method as claimed in claim 6, wherein the step of defining the outer threshold further comprises a step of calculating the outer threshold by the following formula: the inner threshold−a tolerance strength value (toleranceVal), when the inner threshold of the at least one working station (STA) varies, check (Chk) times of the at least one working station (STA) is further recalculated by the following calculation equation: the check (Chk) times=max inner check (Chk) times×(nn+1)÷2, wherein nn=(the max inner threshold−the outer threshold)÷the tolerance strength value (toleranceVal).

8. The wireless network communication method as claimed in claim 5, wherein when the at least one working station (STA) is connected with the each of the at least two slave controllers for uplink, the method further comprises a step of setting, by the master controller, a region counter, the step of setting the region counter further comprises steps of:
  calculating the region counter by the following equation: the region counter=the region counter−2, when the at least one working station (STA) stays in a current region; and
  calculating the region counter by the following equation: the region counter=the region counter+1, when the at least one working station (STA) temporarily moves to a new region.

9. The wireless network communication method as claimed in claim 5, wherein the master controller is equipped with network function, and the each of the at least two slave controllers is equipped with network function and is any one of a computer with wireless function, a wireless router, an access point, a repeater, an extender or a wireless client, the at least one working station (STA) is a wireless client.

* * * * *